US011379946B2

(12) United States Patent
Yamauchi

(10) Patent No.: US 11,379,946 B2
(45) Date of Patent: Jul. 5, 2022

(54) IMAGE PROJECTION SYSTEM CONTROLLING METHOD AND IMAGE PROJECTION SYSTEM

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/314,864

(22) Filed: May 7, 2021

(65) Prior Publication Data

US 2021/0350501 A1 Nov. 11, 2021

(30) Foreign Application Priority Data

May 8, 2020 (JP) .............................. JP2020-082539

(51) Int. Cl.
*G06T 3/00* (2006.01)
*G06T 7/521* (2017.01)
*H04N 9/31* (2006.01)

(52) U.S. Cl.
CPC .............. *G06T 3/005* (2013.01); *G06T 7/521* (2017.01); *H04N 9/3185* (2013.01); *H04N 9/3194* (2013.01)

(58) Field of Classification Search
CPC ...................... G06T 3/005; G06T 7/521; G06T 2207/30208; G06T 7/33; G06T 7/73; H04N 9/3185; H04N 9/3194
See application file for complete search history.

(56) References Cited

U.S. PATENT DOCUMENTS

2016/0173842 A1* 6/2016 De La Cruz ......... H04N 9/3185
353/121
2016/0188124 A1* 6/2016 Ono ..................... H04N 9/3114
345/156

(Continued)

FOREIGN PATENT DOCUMENTS

JP 2016-072691 A 5/2016
JP 2018-181271 A 11/2018
(Continued)

*Primary Examiner* — John W Miller
*Assistant Examiner* — Humam M Satti
(74) *Attorney, Agent, or Firm* — Donna K. Mason

(57) ABSTRACT

A projector is provided with a correction information generator and an image information corrector described below. The correction information generator estimates a reference plane having a normal vector that is the cross product of the average of normal vectors in N regions in the result of measurement of the shape of a projection surface and a first vector corresponding to a component having the largest degree of dispersion among the N normal vectors. The correction information generator estimates an imaginary projection surface by causing the result of projection of the projection surface on the reference surface to rise upright with respect to the reference surface and generates image correction information based on the imaginary projection surface. The image information corrector generates correction image information from image information on a projection image and the correction information. The projector projects an image based on the correction image information on the projection surface.

4 Claims, 12 Drawing Sheets

(56) References Cited

U.S. PATENT DOCUMENTS

2019/0004178 A1 1/2019 Motoyama et al.
2019/0166339 A1* 5/2019 De La Cruz .............. G06T 7/70

FOREIGN PATENT DOCUMENTS

| JP | 2019-047312 A | 3/2019 |
| JP | 2019-139030 A | 8/2019 |
| WO | 2017/159382 A1 | 9/2017 |

* cited by examiner

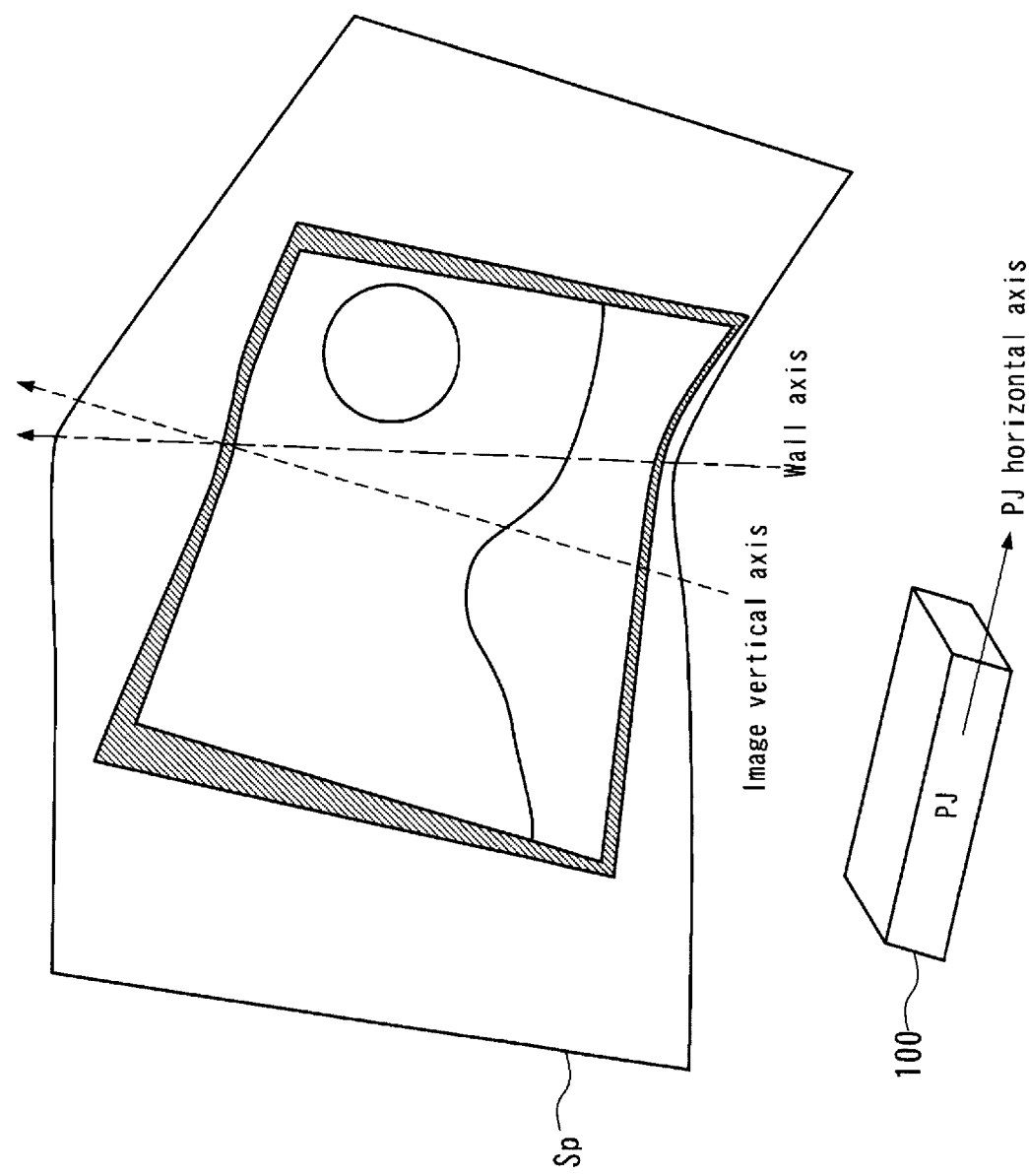

IMAGE PROJECTION SYSTEM CONTROLLING METHOD AND IMAGE PROJECTION SYSTEM

The present application is based on, and claims priority from JP Application Serial Number 2020-082539, filed May 8, 2020, the disclosure of which is hereby incorporated by reference herein in its entirety.

BACKGROUND

1. Technical Field

The present disclosure relates to an image projection system controlling method and an image projection system.

2. Related Art

When an image is projected on a projection surface that is not a simple flat surface, for example, a projection surface having a three-dimensional shape, the image is viewed as a greatly distorted image in some cases depending on the position of the point from which a viewer views the image. For example, JP-A-2019-139030 discloses a technology for measuring the shape of the projection surface by using a three-dimensional measurement technology and projecting a projection image corrected based on the result of the measurement on the projection surface so that a distortion-free image is viewed from the position of a predetermined point of view. The three-dimensional measurement technology for measuring the three-dimensional shape of the projection surface may, for example, be the technology disclosed in JP-A-2018-181271.

The result of the measurement using an existing three-dimensional measurement technology contains noise. Even when the distortion of a projection image is corrected based on a measured noise-containing three-dimensional shape of a projection surface, the correction is undesirably insufficient.

SUMMARY

To solve the problem described above, an image projection system controlling method according to the present disclosure includes estimating a normal vector in each of N regions, into which a projection surface on which an image is projected is divided, based on measurement information, which is a result of three-dimensional measurement of a shape of the projection surface, calculating an average normal vector that is an average of the N normal vectors, calculating a first vector along an axis corresponding to a component having a largest degree of dispersion among the N normal vectors out of three-axis components representing the vector, estimating a reference plane having a normal vector that is a cross product of the first vector and the average normal vector, estimating an imaginary projection surface that is a surface that is based on a result of projection of the three-dimensional shape of the projection surface indicated by the measurement information on the reference plane and is perpendicular to the reference plane, generating correction information for image correction based on the imaginary projection surface, correcting a projection image based on the correction information, and projecting the corrected projection image on the projection surface. N is an integer greater than or equal to two.

To solve the problem described above, an image projection system according to the present disclosure includes a processor programmed to estimate a normal vector in each of N regions, into which a projection surface on which an image is projected is divided, based on measurement information, which is a result of three-dimensional measurement of a shape of the projection surface, calculate an average normal vector that is an average of the N normal vectors, calculate a first vector along an axis corresponding to a component having a largest degree of dispersion among the N normal vectors out of three-axis components representing the vector, estimate a reference plane having a normal vector that is a cross product of the first vector and the average normal vector, estimate an imaginary projection surface that is a surface that is based on a result of projection of the three-dimensional shape of the projection surface indicated by the measurement information on the reference plane and is perpendicular to the reference plane, generate correction information for image correction based on the imaginary projection surface, and correct a projection image based on the correction information and a projection lens that projects the projection image corrected by the processor on the projection surface. Also in the image projection system, N is an integer greater than or equal to two.

BRIEF DESCRIPTION OF THE DRAWINGS

FIG. 14 shows an example of an image projected on a projection surface by using a control method according to a third embodiment of the present disclosure.

DESCRIPTION OF EXEMPLARY EMBODIMENTS

Embodiments of the present disclosure will be described below with reference to the drawings. A variety of technically preferable restrictions are imposed on the embodiments described below. The embodiments of the present disclosure are, however, not limited to the form described below.

1. First Embodiment

Figure 1:
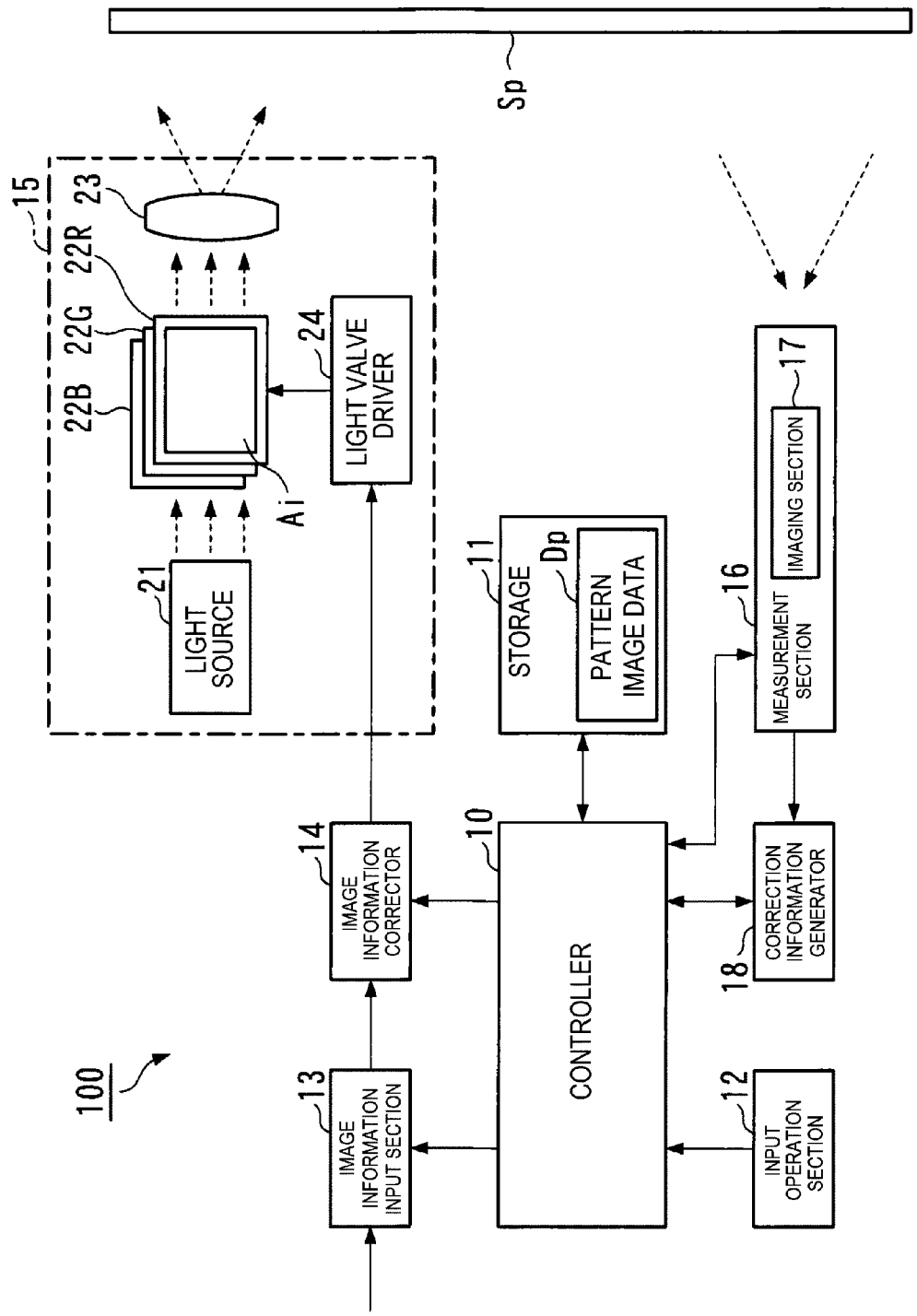
FIG. 1 is a block diagram showing an example of the configurations of a projector according to a first embodiment of the present disclosure.

FIG. 1 is a block diagram showing an example of the configurations of a projector 100, which is a first embodiment of an image projection system according to the present disclosure. The projector 100 includes a controller 10, a storage 11, an input operation section 12, an image information input section 13, an image information corrector 14, an image projection section 15, a measurement section 16, and a correction information generator 18, as shown in FIG. 1. The projector 100 projects an image on a projection surface Sp from the image projection section 15 based on image information inputted to the image information input section 13.

The projector 100 according to the present embodiment can correct image distortion produced in image projection on the projection surface Sp, which is not a simple flat surface, specifically, image distortion produced in image projection on the projection surface Sp having a three-dimensional shape. In a more detailed description, in the projection 100, the image projection section 15 projects a pattern image Ip shown in FIG. 2 on the projection surface Sp, and the measurement section 16 measures the three-dimensional shape of the projection surface Sp. The projector 100 then generates correction information for image correction that allows image projection as if a rectangular sheet is attached to the projection surface Sp having the three-dimensional shape. The projector 100 then caries out a correction process based on the correction information on an image that should be originally displayed, that is, an image that should be displayed with the distortion corrected and projects the processed image on the projection surface Sp. The image that should be displayed with the distortion corrected is hereinafter referred to as a display image.

The controller 10 includes one or more processors. The controller 10 operates in accordance with a control program stored in the storage 11 to oversee and control the action of the projector 100.

The storage 11 includes a RAM (random access memory), which is a volatile memory, and a ROM (read only memory), which is a nonvolatile memory. The RAM is used to temporarily store a variety of data and other pieces of information. The ROM stores, for example, the control program and control data for controlling the action of the projector 100. The storage 11 in the present embodiment stores image data corresponding to the pattern image Ip for measuring the three-dimensional shape of the projection surface Sp. The image data corresponding to the pattern image Ip is hereinafter referred to as pattern image data Dp. The storage 11 may further store image data for the display image.

The input operation section 12 includes a plurality of operation keys that allow a user to issue a variety of instructions to the projector 100. Examples of the operation keys provided at the input operation section 12 may include a power supply key, a menu key, and direction keys. The power supply key is an operation key for switching the state of the power supply between the on state and the off state. The menu key is an operation key that causes a setting menu for a variety of settings to be displayed. The direction keys are operation keys for selecting an item in the setting menu. When the user operates any of the variety of operation keys of the input operation section 12, the input operation section 12 outputs an operation signal according to the content of the user□s operation to the controller 10. The content of the user□s operation is thus transmitted to the controller 10. A remotely operable remote control that is not shown may be used as the input operation section 12. In this case, the remote control issues an infrared operation signal according to the content of the user□s operation, and a remote control signal receiver that is not shown receives the infrared operation signal and outputs the received operation signal to the controller 10.

The image information input section 13 is coupled to an external image supplier that is not shown, such as a computer and an image reproducer, and receives image information for the display image supplied from the image supplier. The image information input section 13 can receive image information which is stored in the storage 11 and is supplied from the controller 10. Specific examples of the image information supplied from the controller 10 to the image information input section 13 may include the pattern image data Dp and the image data for the display image. The image information input section 13 performs a variety of types of processing as required on the image information supplied from the image supplier or the controller 10 under the control of the controller 10 and outputs the processed image information to the image information corrector 14. Specific examples of the processing performed on the image information by the image information input section 13 may include resolution conversion and image quality adjustment.

The image information corrector 14 corrects image distortion resulting from the three-dimensional shape of the projection surface Sp and other factors under the control of the controller 10. Specifically, the image information corrector 14 carries out a correction process based on the correction information inputted from the controller 10 on the image information inputted from the image information input section 13 and outputs corrected image information that is the processed image information to a light valve driver 24 of the image projection section 15.

The image projection section 15 includes a light source 21, three liquid crystal light valves 22R, 22G, and 22B as light modulators, a projection lens 23 as a projection optical system, and the light valve driver 24. In the image projection section 14, the liquid crystal light valves 22R, 22G, and 22B modulate light outputted from the light source 21 to form image light, and the projection lens 23 projects the image light to display an image on the projection surface Sp. The image projection section 15 is an example of the projection apparatus in the present disclosure.

The light source 21 includes a discharge-type light source lamp, such as an ultrahigh-pressure mercury lamp and a metal halide lamp, or a solid-state light source, such as a light emitting diode and a semiconductor laser. The light outputted from the light source 21 is converted by an optical integration system that is not shown into light having a substantially uniform luminance distribution, and a color separation optical system that is not shown separates the converted light into red, green, and blue color light components, which are the three primary colors of light. The red light component is incident on the liquid crystal light valve 22R, the green light component is incident on the liquid crystal light valve 22G, and the blue light component is incident on the liquid crystal light valve 22B.

The liquid crystal light valves 22R, 22G, and 22B are each formed, for example, of a transmissive liquid crystal panel including a liquid crystal material encapsulated between a pair of transparent substrates. The liquid crystal panels each have a rectangular image formation region Ai formed of a plurality of pixels arranged in a matrix, and drive voltage is applicable to the liquid crystal material on a pixel basis.

The light valve driver 24 forms an image in the image formation region Ai of each of the liquid crystal light valves 22R, 22G, and 22B. Specifically, the light valve driver 24 applies drive voltage according to the image information inputted from the image information corrector 14 to each of the pixels in the image formation region Ai to set the pixel to have optical transmittance according to the image information. The light outputted from the light source 21 passes through the image formation regions Ai of the liquid crystal light valves 22R, 22G, and 22B and is therefore modulated on a pixel basis to form image light fluxes according to the image information on a color light flux basis. The thus formed color image light fluxes are combined with one another on a pixel basis by a light combining optical system that is not shown into image light representing a color image, and the projection lens 23 enlarges and projects the image light on the projection surface Sp. As a result, an image based on the image information is displayed on the projection surface Sp.

The measurement section 16 operates under the control of the controller 10 and measures the three-dimensional shape of the projection surface Sp. The measurement section 16 includes an imaging section 17 for capturing an image of the pattern image Ip. The imaging section 17 is a camera including an imaging device, such as a CCD (charge coupled device) sensor and a CMOS (complementary metal oxide semiconductor) sensor. In FIG. 1, the imaging device is not shown. The imaging section 17 captures an image of the pattern image Ip projected from the image projection section 15 on the projection surface Sp to generate captured image information representing the captured image. The imaging section 17 is an example of the imaging apparatus in the present disclosure.

The measurement section 16 measures the three-dimensional shape of the projection surface Sp based on the captured image information generated by the imaging section 17. Specifically, the measurement section 16 detects a plurality of reference points from an image based on the captured image information, that is, the pattern image Ip contained in the captured image captured by the imaging section 17 and derives the three-dimensional coordinates of each of the reference points. The measurement section 16 is an example of the measurement apparatus in the present disclosure. The measurement section 16 outputs the derived three-dimensional coordinates of each of the reference points to the correction information generator 18 as a measurement result.

The correction information generator 18 operates under the control of the controller 10 and generates the correction information for correcting image distortion according to the three-dimensional shape of the projection surface Sp based on the result of the measurement performed by the measurement section 16. The correction information generator 18 outputs the generated correction information to the controller 10. The correction information generator 18 and the image information corrector 14 are an example of the correction apparatus in the present disclosure.

The image information input section 13, the image information corrector 14, the measurement section 16, and the correction information generator 18 may be formed of one or more processors or any other component or a dedicated processing apparatus, such as an ASIC (application specific integrated circuit) and an FPGA (field programmable gate array).

Figure 2:
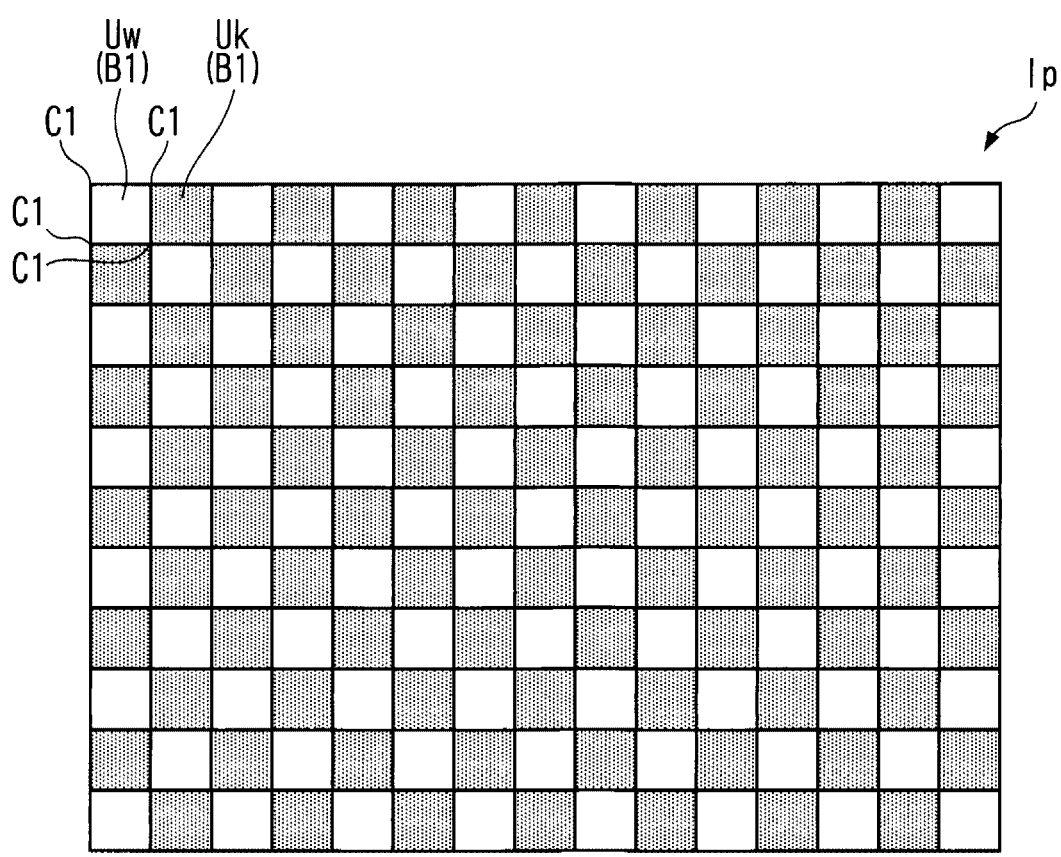
FIG. 2 shows an example of a pattern image for measuring the three-dimensional shape of a projection surface.

FIG. 2 shows an example of the pattern image Ip for measuring the three-dimensional shape of the projection surface Sp. The pattern image Ip is a rectangular image formed in the image formation regions Ai. The pattern image Ip is an image formed of white unit patterns Uw and black unit patterns Uk arranged in a 15×11 matrix, as shown in FIG. 2. The unit patterns Uw and unit patterns Uk are all congruent rectangles. In the pattern image Ip, the unit patterns Uw and the unit patterns Uk are so arranged in a checkerboard pattern that unit patterns having the same color are not adjacent to each other in the upward/downward and rightward/leftward direction.

The measurement section 16 detects the vertices of each of the white unit patterns Uw, that is, the corners of each of the unit patterns Uw as reference points C1 from the pattern image Ip captured by the imaging section 17. In the rectangular pattern image Ip, the reference points C1 are arranged in a 16×12 matrix. The pattern image Ip can also be considered as a lattice-shaped image formed of the contours of the unit patterns Uw and the unit patterns Uk. In this case, the pattern image Ip is formed of lateral lines that are a plurality of parallel straight lines and longitudinal lines that are a plurality of parallel straight lines perpendicular to the lateral lines, and the intersections of the lateral and longitudinal lines, that is, the intersections of the squares of the lattice are the reference points C1. An axis parallel to the plurality of lateral lines described above is an example of the first axis in the present disclosure, and an axis parallel to the plurality of longitudinal lines described above is an example of the second axis in the present disclosure. The first axis is called a lateral axis and the second axis is called a longitudinal axis in some cases in the following description. In the rectangular pattern image Ip, the lattice interval along the longitudinal axis, that is, the interval between the reference points C1 along the longitudinal axis is an equal interval, and the lattice interval along the lateral axis, that is, the interval between the reference points C1 along the lateral axis is also an equal interval. The angles of each of the squares of the lattice, that is, the angles between the longitudinal lines and the lateral lines are each a right angle. The region corresponding to each of the unit patterns Uw and the unit patterns Uk, that is, a rectangular region having as vertices four reference points C1 adjacent to one another longitudinally, laterally, and obliquely is called a block B1 in some cases.

The action of the projector 100 will next be described.

Figure 3:
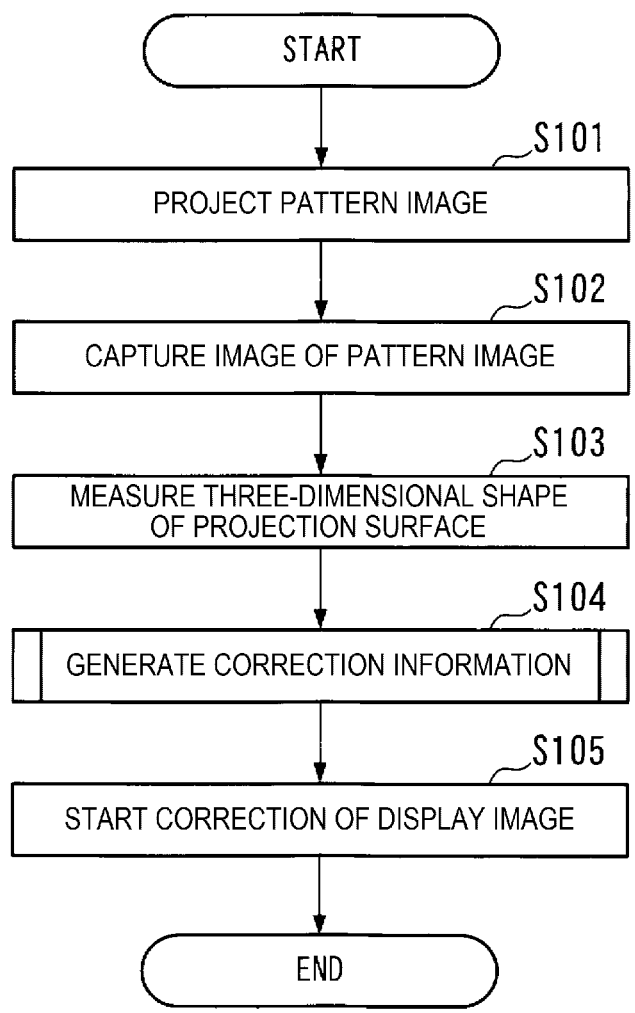
FIG. 3 is a flowchart showing the procedure of the action of the projector when performing distortion correction.
Figure 4:
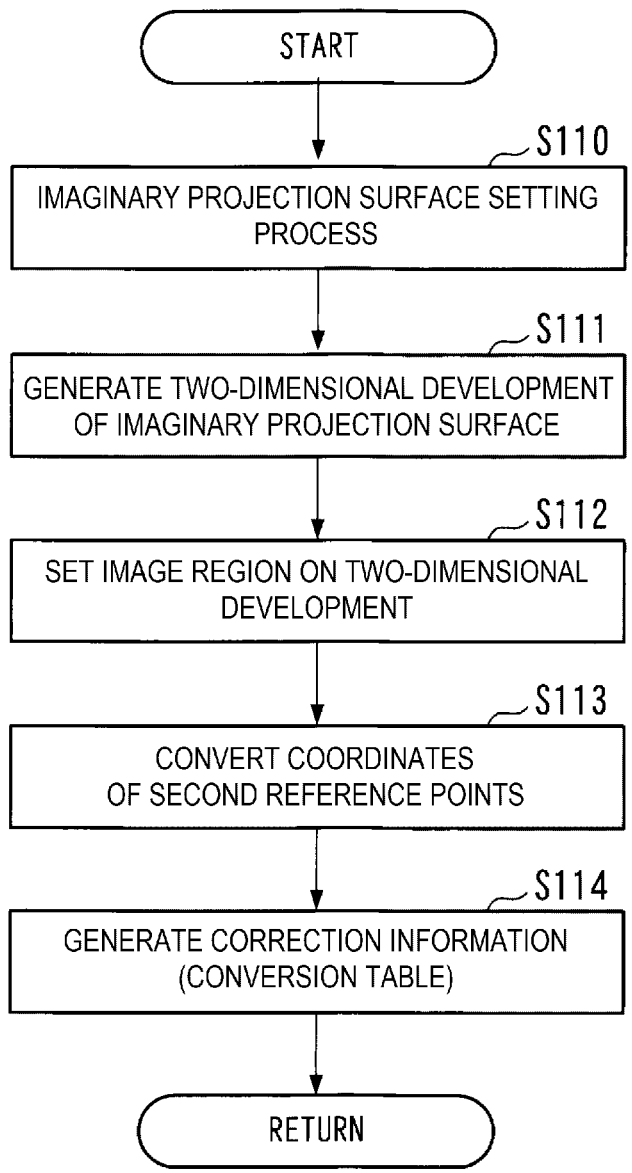
FIG. 4 is another flowchart showing the procedure of the action of the projector when performing distortion correction.

FIGS. 3 and 4 are flowcharts showing the procedure of the action of the projector 100 when performing the distortion correction, that is, the procedure of a method for controlling the image projection system according to the present disclosure. When the user operates the input operation section 12 of the projector 100 to instruct start of the distortion correction, the controller 10 of the projector 100 operates in accordance with the flowchart shown in FIG. 3.

In step S101 in FIG. 3, the controller 10 causes the image projection section 15 to project the pattern image Ip shown in FIG. 2. Specifically, the controller 10 reads the pattern image data Dp from the storage 11 and outputs the read pattern image data Dp to the image information input section 13. The controller 10 instructs the image information corrector 14 not to carry out the correction process. As a result, the pattern image Ip is formed across each of the image formation regions Ai, and the pattern image Ip is projected on the projection surface Sp. When the projection surface Sp is not a flat surface, the pattern image Ip is displayed but distorted on the projection surface Sp.

In step S102, the controller 10 instructs the measurement section 16 to cause the imaging section 17 to capture an image of the pattern image Ip projected on the projection surface Sp.

Figure 5:
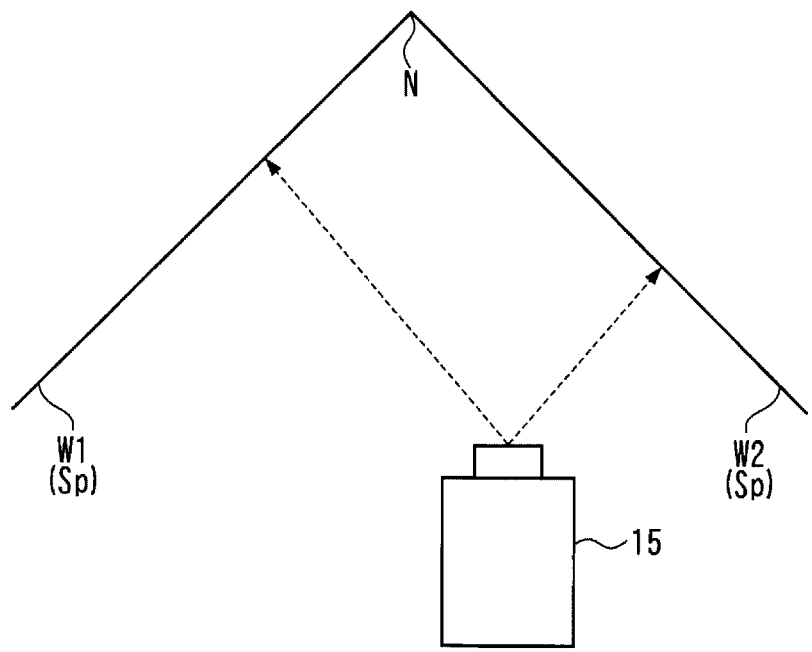
FIG. 5 shows an example of the plan view of the vertically disposed projection surface viewed from above.
Figure 6:
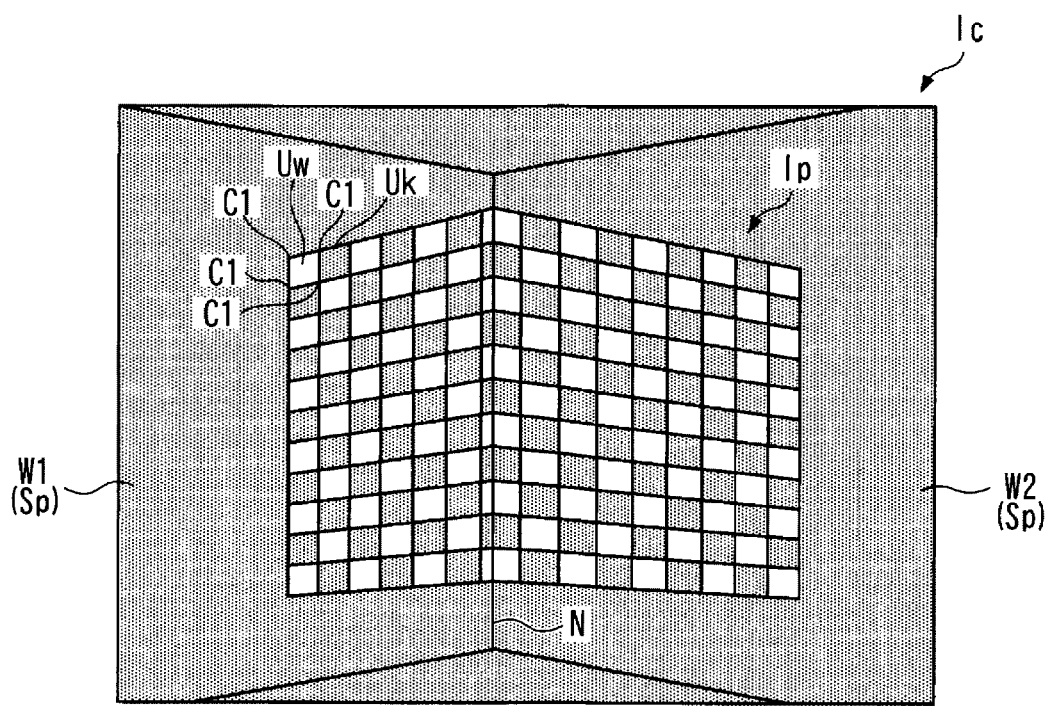
FIG. 6 shows an example of a captured image captured by an imaging section.

For example, it is assumed that an image is projected across a range where flat surfaces W1 and W2, which are two wall surfaces, intersect each other at right angles, and which contains a corner N, which is recessed in the depth direction when viewed from the image projection section 15, as shown in FIG. 5. FIG. 5 is a plan view of the vertically disposed projection surface Sp viewed from above, and the two flat surfaces W1 and W2, which intersect each other at right angles in the example shown in FIG. 5, form the projection surface Sp. In this case, the distance from the image projection section 15 to the projection surface Sp is longer in a position closer to the corner N. FIG. 6 shows a captured image Ic captured by the imaging section 17. The pattern image Ip projected from the image projection section 15 on the projection surface Sp is so distorted as to be enlarged by a greater degree in a position closer to the corner N, as shown in FIG. 6, and the imaging section 17 captures an image of the thus displayed but distorted pattern image Ip as the captured image Ic.

Referring back to FIG. 3, in step S103, the controller 10 instructs the measurement section 16 to cause the measurement section 16 to measure the three-dimensional shape of the projection surface Sp based on the captured image Ic captured by the imaging section 17. Upon reception of the instruction from the controller 10, the measurement section 16 detects the plurality of reference points C1 from the pattern image Ip contained in the captured image Ic. The coordinates of each of the reference points C1 in the rectangular pattern image Ip are known and stored in the storage 11 in advance. The coordinates of each of the reference points C1 stored in the storage 11 are hereinafter referred to as reference coordinates. The measurement section 16 derives the three-dimensional coordinates of each of the reference points C1 on the projection surface Sp by using the principle of triangulation based on the correspondence between the detected coordinates of the reference points C1, that is, the coordinates of the reference points C1 in the captured image Ic and the reference coordinates stored in the storage 11. The measurement section 16 can determine the three-dimensional coordinates with respect, for example, to an origin that is the principal point of an imaging lens that is not shown in the imaging section 17. The three-dimensional coordinates allows recognition of the three-dimensional shape of the projection surface Sp and the distortion of the image on the projection surface Sp. The three-dimensional coordinates of the reference points C1 on the projection surface Sp that are calculated in step S103 are the result of the three-dimensional measurement of the shape of the projection surface Sp and are an example of the measurement information in the present disclosure.

Figure 7:
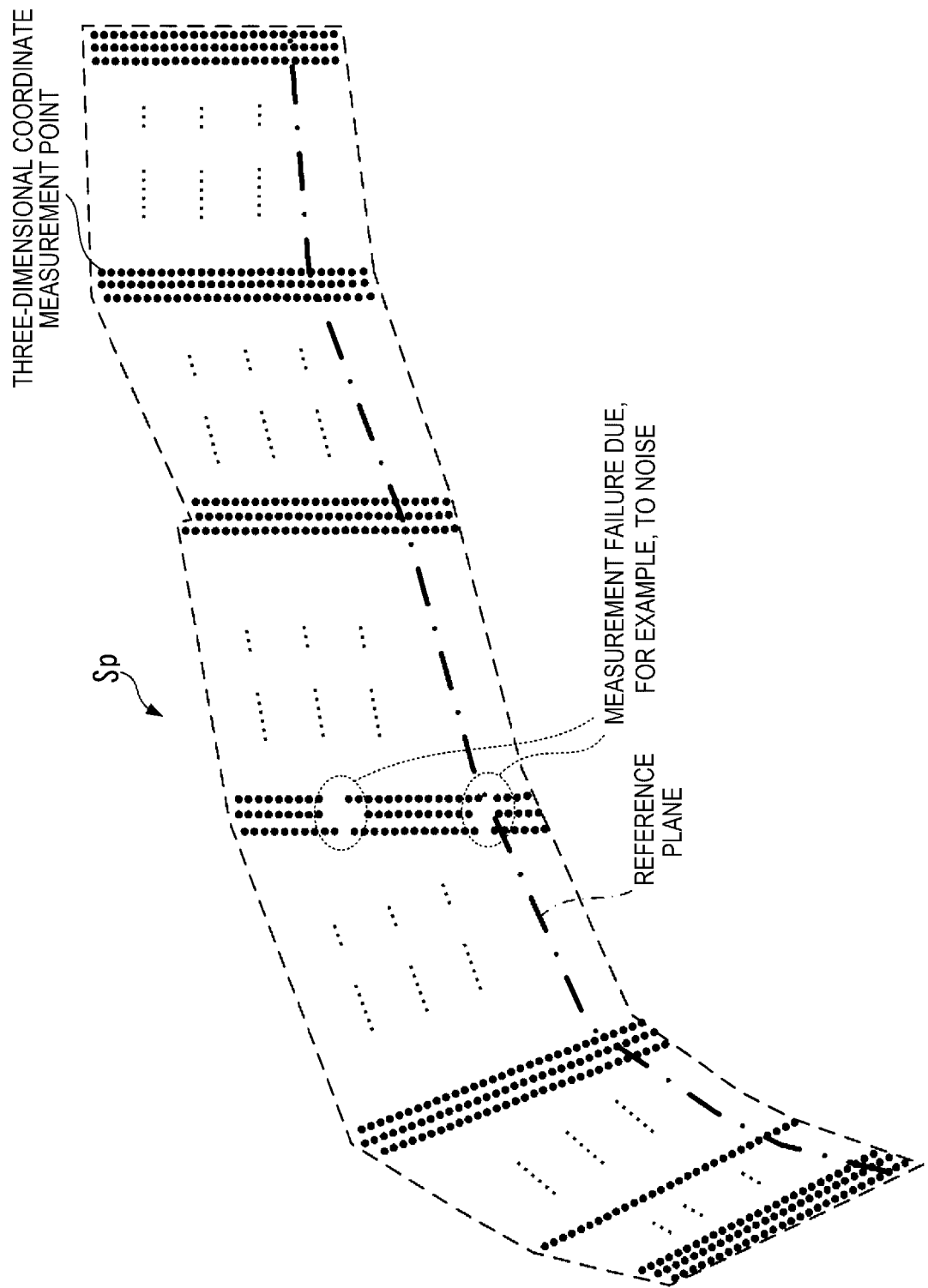
FIG. 7 shows an example of the result of three-dimensional measurement of the shape of the projection surface.

For example, it is assumed that a three-dimensional shape that changes in a single axial direction, as a folding screen does, is measured as the shape of the projection surface Sp, as shown in FIG. 7. In three-dimensional measurement, it is practically not possible to suppress noise to an infinitesimal level. It can be ascertained by referring to FIG. 7 that the projection pattern unsatisfactorily scattered on the projection surface Sp does not allow acquisition of a sufficient signal and causes other problems, leading, for example, to distortion of the three-dimensional shape due to a clearly prominent depth error, a large measurement failure region, and minute measurement failure.

Referring back to FIG. 3, in step S104, the controller 10 instructs the correction information generator 18 to cause the correction information generator 18 to generate the correction information for correcting the distortion resulting from the three-dimensional shape of the projection surface Sp based on the derived three-dimensional coordinates of the reference points C1. Upon reception of the instruction, the correction information generator 18 operates in accordance with the procedure shown in FIG. 4 and starts generation of the correction information.

In step S110, the correction information generator 18 carries out an imaginary projection surface setting process, as shown in FIG. 4. When the image distortion is automatically corrected, desired distortion correction cannot be performed if the accuracy of the measurement of the three-dimensional shape of the projection surface Sp, which is the prerequisite of the correction, is insufficient. If the noise cannot be suppressed to an infinitesimal level, it is important to somehow compensate the correction. The imaginary projection surface setting process carried out in step S110 is the process of compensating the noise contained in the result of the measurement of the three-dimensional shape of the projection surface Sp. In the imaginary projection surface setting process, the correction information generator 18 sets, based on the three-dimensional coordinates of the reference points C1 derived by the measurement section 16, an imaginary projection surface resulting from removal of at least part of the noise contained in the result of the three-dimensional measurement of the shape of the projection surface Sp.

Figure 8:
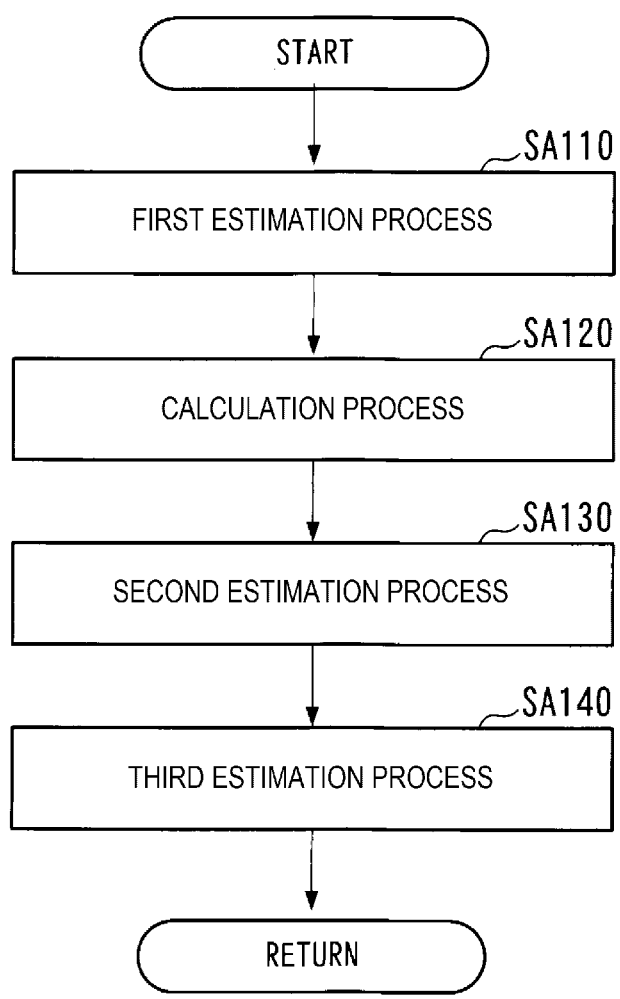
FIG. 8 is a flowchart showing the procedure of an imaginary projection surface setting process carried out by the projector when performing the distortion correction.

FIG. 8 is a flowchart showing the content of the processes in the imaginary projection surface setting process carried out in step S110 by the correction information generator 18. The imaginary projection surface setting process includes a first estimation process SA110, a calculation process SA120, a second estimation process SA130, and a third estimation process SA140, as shown in FIG. 8. The correction information generator 18 first carries out the first estimation process SA110, as shown in FIG. 8. In the first estimation process SA110, the correction information generator 18 estimates a normal vector for each of unit regions produced by dividing the projection surface Sp into N regions based on the three-dimensional coordinates of the reference points C1 derived by the measurement section 16. N is an integer greater than or equal to two. For example, when the projection surface Sp is divided into 32 regions in the longitudinal direction and 20 regions in the lateral direction, N is equal to 32×20 or 640. When N is equal to 640, the correction information generator 18 estimates a normal vector for each of the 640 unit regions. As a result, 640 normal vectors are produced. The N normal vectors calculated in the first estimation process SA110 is hereinafter referred to as a normal vector group.

In the calculation process SA120, which follows the first estimation process SA110, the correction information generator 18 calculates, based on the normal vector group, two reference vectors that specify a reference plane that serves as a reference when the imaginary projection surface is estimated. A first reference vector that is one of the two reference vectors is an average normal vector produced by calculating an arithmetic average of the normal vector groups for the three-axis components representing the vector. A second reference vector that is the other one of the two reference vectors is a vector along an axis corresponding to a component having the largest degree of dispersion in the normal vector group out of the three-axis components representing the vector. The second reference vector is an example of the first vector in the present disclosure.

Figure 9:
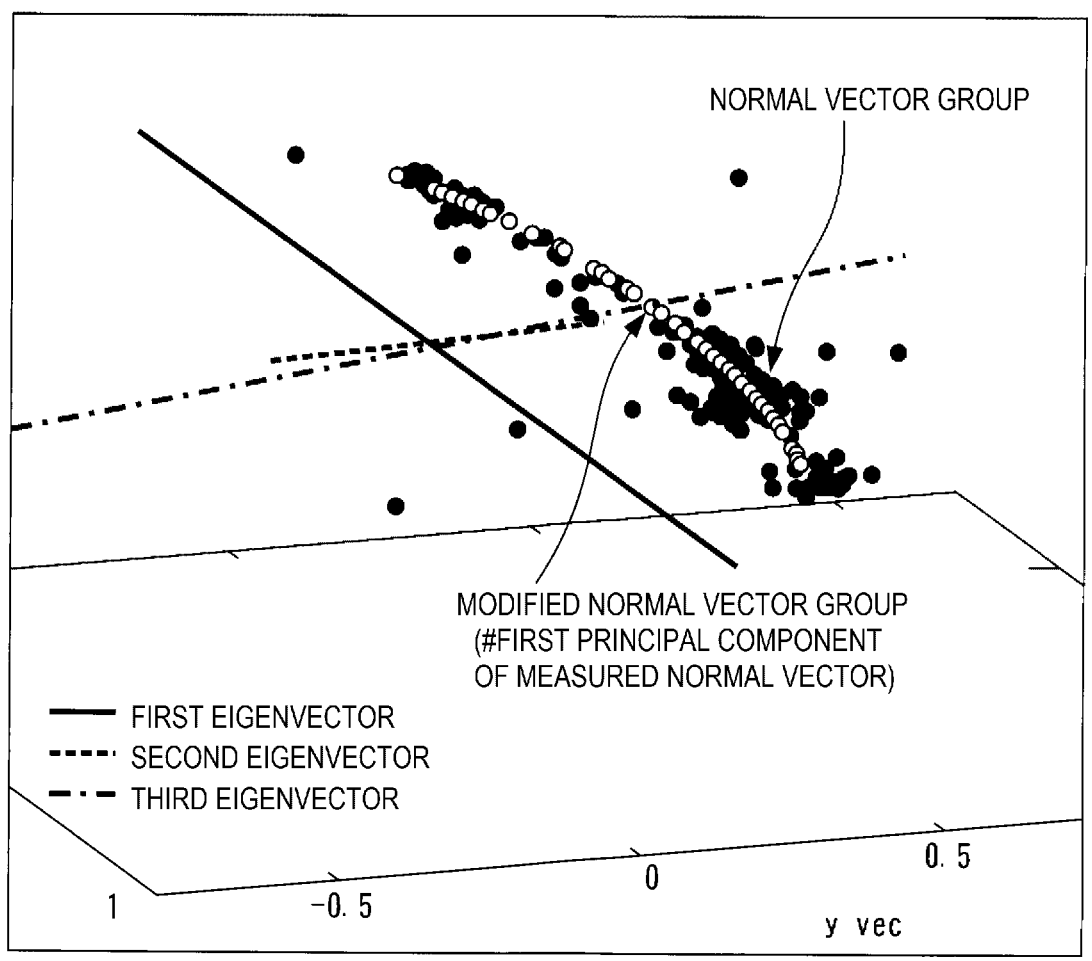
FIG. 9 shows an example of a normal vector group calculated by the projector in an imaginary projection surface setting process.

In the present embodiment, the correction information generator 18 performs principal component analysis on the normal vector group to calculate the second reference vector from a modified normal vector group produced by focusing only on the first principal component. The principal component analysis is one of multivariate analysis methods and is a method for dimensionally compressing data formed of multiple variates into a dispersion maximization component. The first principal component is a first eigenvector produced by the principal component analysis. For example, the modified normal vector group shown in FIG. 9 is determined by performing the principal component analysis on a normal vector group estimated by the result of the measurement of the three-dimensional shape shown in FIG. 7. Performing the principal component analysis on a normal vector group having three-dimensional dispersion allows the normal vector group to be degenerated into a modified normal vector group produced by focusing only on a one-dimensional component having the largest dispersion, and the arithmetic average of the modified normal vector group becomes the second reference vector. The calculation of the first reference vector and the calculation of the second reference vector may be performed in a simultaneous and in-parallel manner, or one of the calculations may be performed after the other. The process of calculating the first reference vector is an example of the first calculation process in the present disclosure, and the process of calculating the second reference vector is an example of the second calculation process in the present disclosure. That is, the calculation process SA120 in the present embodiment corresponds to the first calculation process and the second calculation process in the present disclosure.

In the second estimation process SA130, which follows the calculation process SA120, the correction information generator 18 estimates a reference plane based on the first and second reference vectors. More specifically, the correction information generator 18 estimates, as the reference plane, a plane having a normal vector that is the cross product of the first reference vector and the second reference vector. The cross product of two vectors is also called a vector product.

Figure 10:
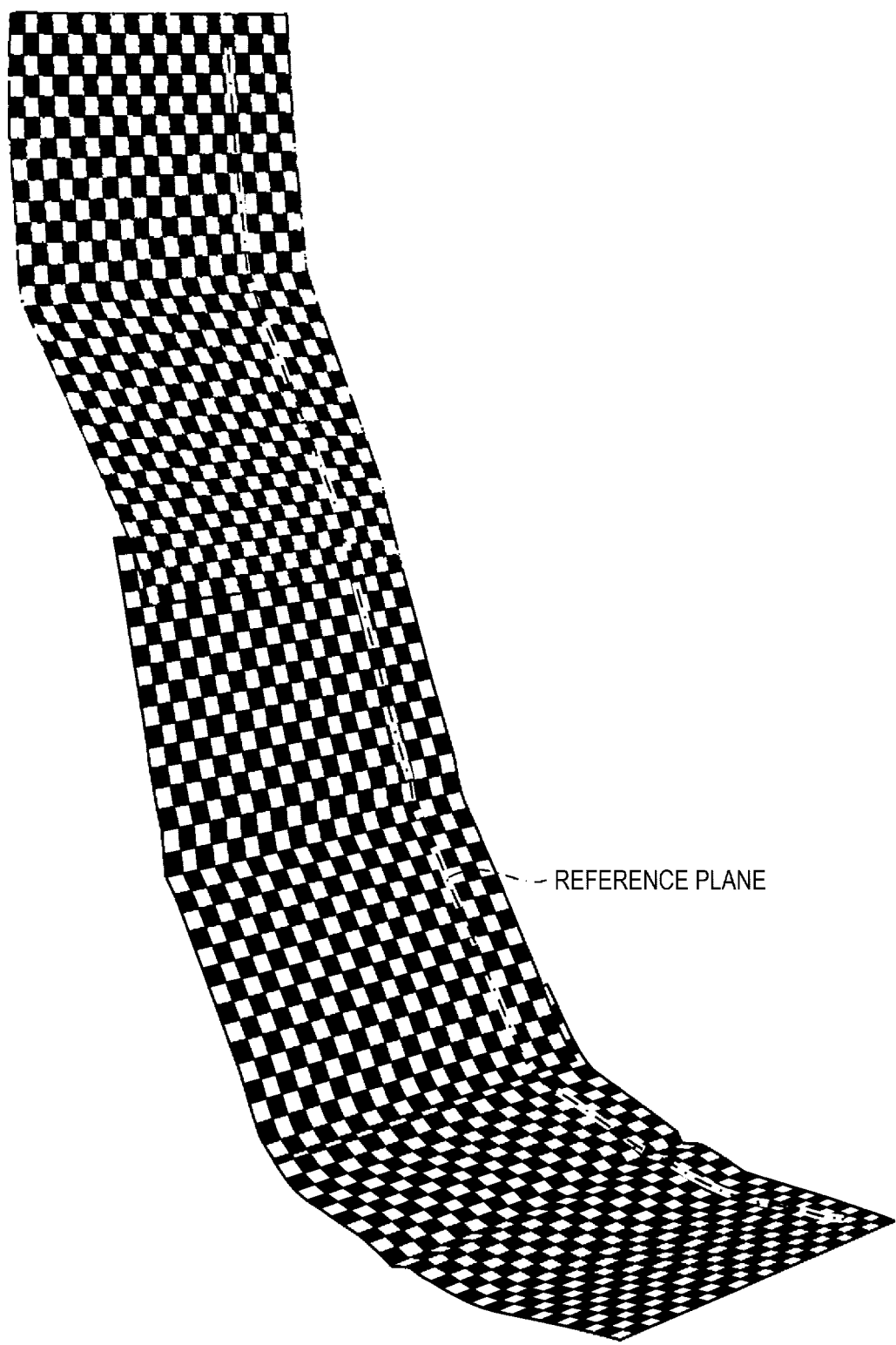
FIG. 10 shows an example of an imaginary projection surface estimated in the imaginary projection surface setting process.

In the third estimation process SA140, which follows the second estimation process SA130, the correction information generator 18 first projects each point indicated by the measurement information on the reference plane. The correction information generator 18 then carries out a filtering process on the result of the projection of each point indicated by the measurement information on the reference plane, that is, a set of the points projected on the reference plane. In the filtering process, the projection result or the set of the points are degenerated in a direction that intersects both the normal vector to the reference plane and the second reference vector into a single line. A specific example of the filtering process may be a filtering process using a Gaussian filter. The correction information generator 18 then estimates an imaginary projection surface by extending, along the normal vector to the reference plane, the line as the result of the degeneration in the filtering process described above. In the third estimation process SA140, the projection of each point indicated by the measurement information on the reference plane removes the noise in the component corresponding to the direction of the normal vector to the reference plane. Further, the filtering process using a Gaussian filter or any other filter on the result of the projection of each point indicated by the measurement information on the reference plane removes the noise in the component corresponding to the direction that intersects both the normal vector to the reference plane and the second reference vector. FIG. 10 shows an example of the imaginary projection surface estimated from the result of the three-dimensional measurement of the projection surface Sp shown in FIG. 7.

The content of the imaginary projection surface setting process in the present embodiment has been described.

Figure 11:
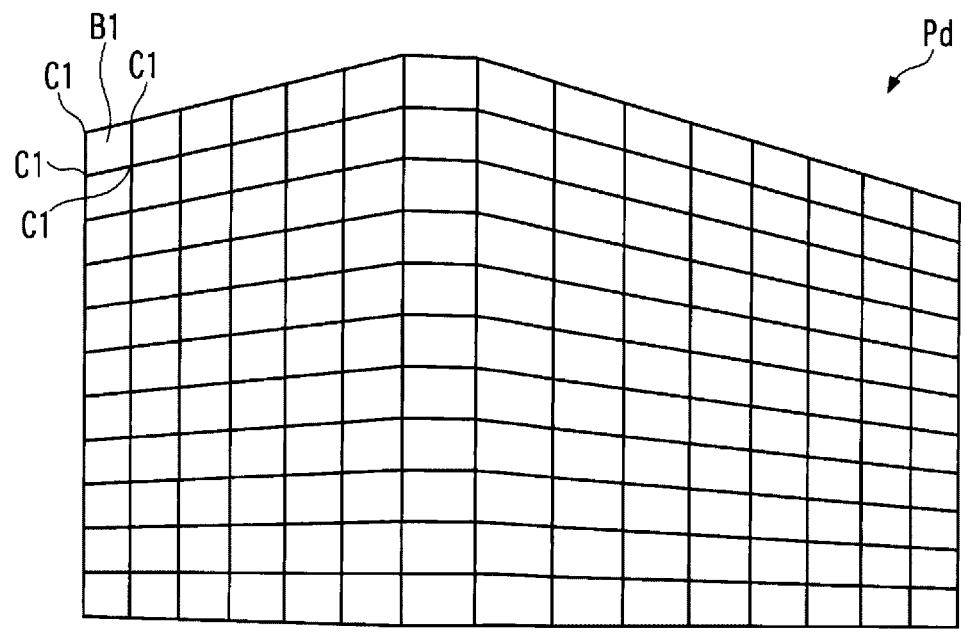
FIG. 11 shows an example of a two-dimensional development generated by a correction information generator.

Referring back to FIG. 4, in step S111, the correction information generator 18 generates a two-dimensional development that is the imaginary projection surface set in the imaginary projection surface setting process in step S110 and developed on a single flat plane. For example, it is assumed that the two flat surfaces W1 and W2, which intersect each other at right angles as shown in FIG. 5, are set as the imaginary projection surface in the imaginary projection surface setting process. FIG. 11 shows an example of a two-dimensional development Pd generated from the imaginary projection surface described above by the correction information generator 18. The two-dimensional development Pd is an imaginary figure showing the positional relationship among the reference points C1 on the imaginary projection surface on which the pattern image Ip is projected and shows the distortion of the pattern image Ip on the imaginary projection surface, as shown in FIG. 11. In FIG. 11, the reference points C1 adjacent to each other along the longitudinal and lateral axes are connected to each other via straight lines for convenience. That is, the two-dimensional development Pd includes a plurality of rectangular blocks B1 corresponding to the unit patterns Uw and the unit patterns Uk of the pattern image Ip, and the vertices of each of the blocks B1 are reference points C1. In the two-dimensional development Pd, the length of the edges of each of the blocks B1, that is, the distance between adjacent reference points C1 is equal to the length of the edges of the corresponding unit pattern Uw or Uk on the imaginary projection surface. The angle at the vertices of each of the blocks B1 in the two-dimensional development Pd is equal to the angle at the vertices of the corresponding unit pattern Uw or Uk on the imaginary projection surface.

Thereafter, in step S112, the correction information generator 18 sets an image region for forming the display image on the generated two-dimensional development Pd. The image region is a rectangular region similar to the original shape of the display image, that is, the image formation regions Ai. The image area is so preferably positioned and sized as not to extend off the two-dimensional development Pd and as to be maximized in size.

Figure 12:
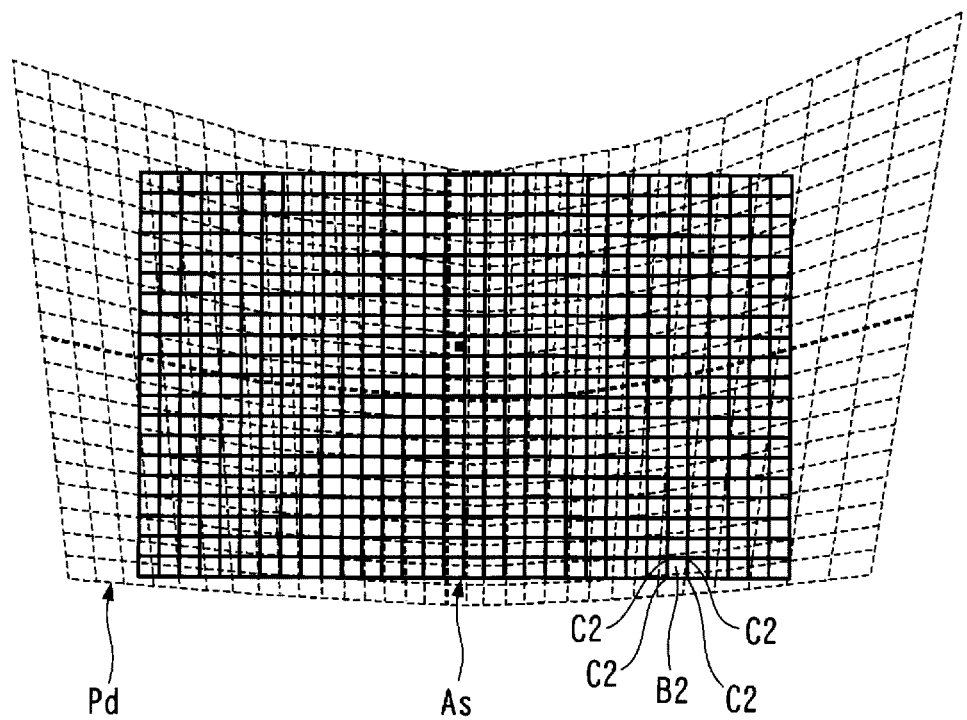
FIG. 12 shows an example of an image region set in the two-dimensional development.

FIG. 12 shows an image region As set in the two-dimensional development Pd. The image region As is a rectangular region similar to the original shape of the display image, that is, the image formation regions Ai and is so positioned and sized as not to extend off the two-dimensional development Pd and as to be maximized in size. In FIG. 12, a lattice pattern corresponding to the pattern image Ip is drawn in the image region As for convenience, and rectangular blocks B2 separated by the squares of the lattice correspond to the blocks B1 in the rectangular pattern image Ip. The lattice interval along each of the longitudinal and lateral axes in the image region As is an equal interval, as in the pattern image Ip, and the angle of each of the squares of the lattice is a right angle. The intersections of the squares of the lattice in the image region As are reference points C2 corresponding to the reference points C1 in the pattern image Ip. In the following description, the reference points C1 are called first reference points C1 and the reference points C2 are called second reference points C2 in some cases. The correction information generator 18 thus arranges a plurality of second reference points C2 in a matrix in the image region As set in the two-dimensional development Pd.

Returning back to FIG. 4, in step S113, the correction information generator 18 carries out a coordinate conversion process of converting the coordinates of the second reference points C2 in the two-dimensional development Pd into coordinates in a rectangular image corresponding to the image formation regions Ai. The rectangular image corresponding to the image formation regions Ai is hereinafter also referred to as a basic image. In a more detailed description, the correction information generator 18 derives the coordinates of the second reference points C2 based on the correspondence between the coordinates of the first reference points C1 in the rectangular pattern image Ip and the coordinates of the first reference points C1 in the two-dimensional development Pd when the shape of the two-dimensional development Pd in which the second reference points C2 are arranged is deformed to the shape of a basic image, that is a rectangular shape. The image region As containing the second reference points C2 is distorted in the coordinate conversion process described above and placed in the basic image. The second reference points C2 in the basic image correspond to an image that is formed of the second reference points C2 in the two-dimensional development Pd rearranged in the imaginary projection surface and is viewed from the position of the image projection section 15.

Thereafter, in step S114, the correction information generator 18 generates the correction information for distortion correction based on the coordinates of the second reference points C2 arranged in the basic image. The process in step S114 is an example of the generation process in the present disclosure. The correction information is, for example, a conversion table for deforming the display image based on the coordinates of the four vertices of each of the plurality of divided blocks B1 in the display image, that is, the four first reference points C1 and the coordinates of the four vertices of the corresponding block B2 in the image region As in the basic image, that is, the second reference points C2. A specific example of the deformation may be projection conversion. The correction information generator 18 outputs the generated correction information to the controller 10. The controller 10 then returns to the processes in the procedure shown in FIG. 3.

Referring back to FIG. 3, in step S105, the controller 10 outputs the inputted correction information to the image information corrector 14 and causes the image information corrector 14 to start the correction process of correcting the display image based on the correction information. The correction process that starts in step S105 is an example of the correction process in the present disclosure. The image information corrector 14 then carries out the correction process according to the correction information on the image information for the display image successively inputted from the image information input section 13. Specifically, the image information corrector 14 carries out the process of forming the display image in the image region As of the basic image and drawing the region outside the image region As in black. As a result, the image projection section 15 projects an image based on the corrected image information, and the display image is displayed on the projection surface Sp with the distortion corrected. The overall image projected from the projector 100 is distorted, but the region outside the image region As is drawn in black, whereby the viewer visually recognizes only the display image formed in the image region As. The image region As, which is a distortion-free rectangular region in the two-dimensional development Pd, is shaped and displayed on the actual projection surface Sp as if a rectangular sheet is attached along the projection surface Sp.

When the image information representing the display image is inputted to the image information input section 13, the image information corrector 14 carries out the correction process described above, and the image projection section 15 projects the display image on the projection surface Sp with the distortion corrected. The projection of the display image by the image projection section 15 is an example of the projection process in the present disclosure.

The projector 100 according to the present embodiment can satisfactorily generate a distortion-corrected image even when the result of the three-dimensional measurement of the shape of the projection surface Sp contains noise corresponding, for example, to a measurement failure location. In the present embodiment, the case where the result of the three-dimensional measurement contains, for example, noise due to measurement failure is presented by way of example, and the same process in the present embodiment is applicable also to a case where an unwanted object unrelated to the projection surface Sp is present in the vicinity of the projection surface Sp. For example, when the projection surface Sp is a magnet-type whiteboard, and an unwanted object, such as a magnet, is attached to the whiteboard, the distortion correction does not need to be performed in accordance with the shape of the magnet. Also in the case described above, the principal component analysis described above can be used to estimate an imaginary projection surface to remove a component unrelated to the projection surface Sp.

As described above, the projector 100 according to the present embodiment can provide the following effects: (1) The projector 100 according to the present embodiment projects the result of the three-dimensional measurement of the projection surface for the estimation of an imaginary projection surface on the reference plane to remove at least part of noise contained in the result of the three-dimensional measurement and further carries out the filtering process on the result of the projection on the reference plane to further remove noise in a direction that intersects both the normal vector to the reference plane and the second reference vector. Since the correction information is generated based on the imaginary projection surface from which at least part of the noise contained in the result of the three-dimensional measurement has been removed as described above, the present embodiment allows reduction in the effect of the noise contained in the result of the measurement on the projection image distortion correction based on the result of the measurement of the three-dimensional shape of the projection surface Sp.

(2) In the projector 100 according to the present embodiment, when image information representing a lattice pattern in which a plurality of longitudinal lines arranged in parallel to each other at equal intervals and a plurality of lateral lines arranged in parallel to each other at equal intervals are perpendicular to each other is inputted, the image information corrector 14 corrects the image information in such a way that the lattice interval ratio and the angle of the squares of the lattice are maintained in the imaginary projection surface having a three-dimensional shape, that is, the squares of the lattice are arranged at equal intervals and the angle of the squares is a right angle. An unnatural impression given to the viewer can therefore be suppressed irrespective of the position of the viewer.

(3) In the projector 100 according to the present embodiment, since the measurement section 16 measures the three-dimensional shape of the projection surface Sp by causing the imaging section 17 to capture an image of the pattern image Ip projected by the image projection section 15, no dedicated apparatus for measuring the three-dimensional shape is required.

(4) In the projector 100 according to the present embodiment, the image projection section 15 and the measurement section 16 are integrated with each other, whereby the arrangement of the image projection section 15 and the measurement section 16 does not need to be adjusted whenever the measurement is performed.

2. Other Embodiments

Figure 13:
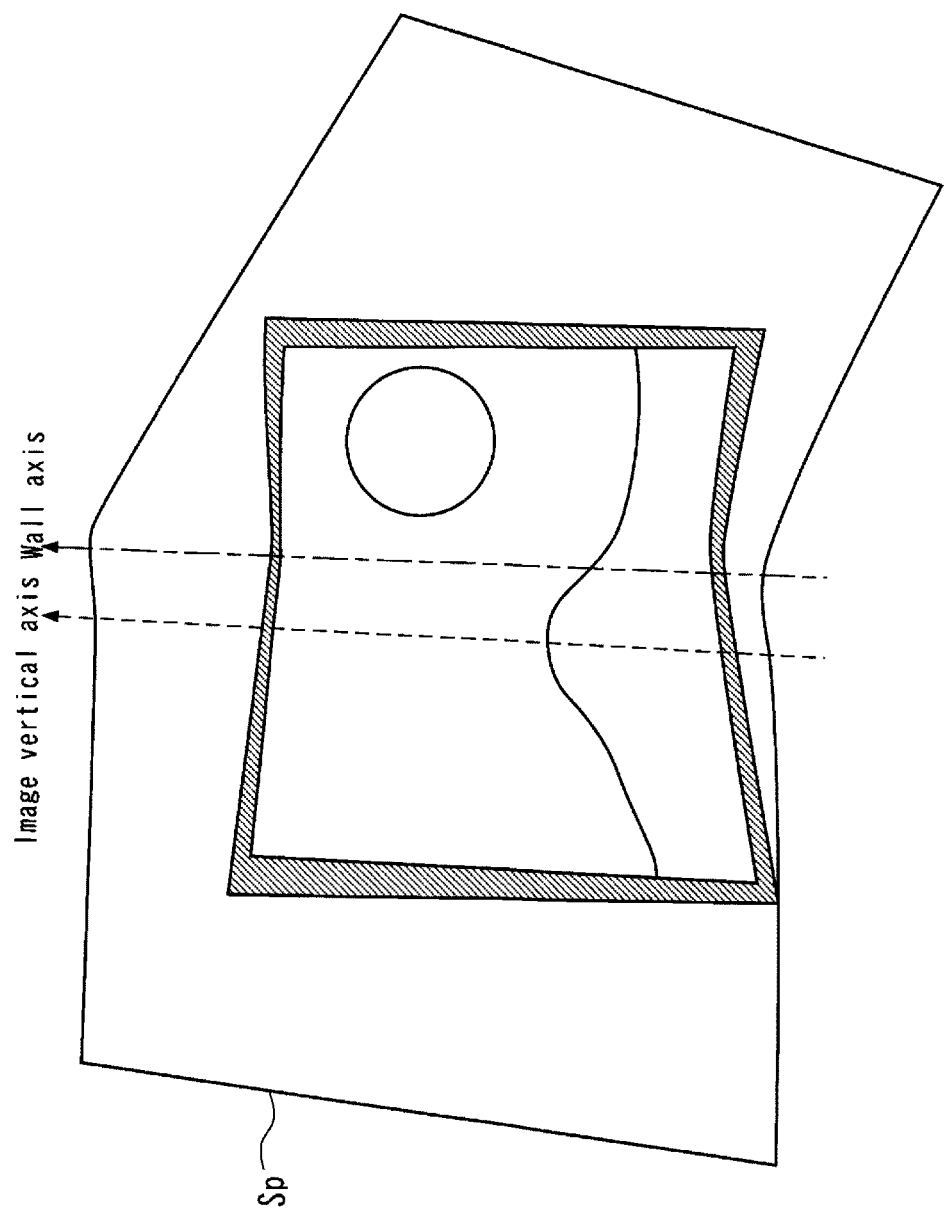
FIG. 13 shows an example of an image projected on a projection surface by using a control method according to a second embodiment of the present disclosure.

FIG. 13 shows an example of an image projected on a projection surface by using the control method according to a second embodiment of the present disclosure. The present embodiment differs from the first embodiment in that the correction information is so generated that the vertical axis in the display image coincides with the normal vector to the reference plane. In FIG. 13, the normal vector to the reference plane is labeled with Wall axis. The control method according to the present disclosure includes the calculation process of calculating the normal vector to the reference plane, in other words, a vertical axis in the projection surface, and the result of the calculation in the calculation process can be used to automatically generate a corrected image, such as that shown in FIG. 13. The correction information may instead be so generated that the vertical axis in a projection image belongs to the reference plane, in other words, the horizontal axis in a projection image coincides with Wall axis. When the vertical or horizontal axis in a projection image coincides with Wall axis, an image that fits to a given space can be preferably provided to the viewer.

FIG. 14 shows an example of an image projected on a projection surface by using the control method according to a third embodiment of the present disclosure. The present embodiment differs from the first embodiment in that the correction information is so generated that an axis contained in the bottom surface of the projector 100 coincides with the horizontal axis in the display image, in other words, the inclination of the vertical axis in a projection image with respect to the normal vector to the reference plane coincides with the inclination of the projector with respect to the vertical axis. In FIG. 14, the axis contained in the bottom surface of the projector 100 is labeled with PJ horizontal axis. The inclination of the projector 100 with respect to the vertical axis may be determined by providing the projector 100 with a sensor that detects the attitude of the projector 100 with respect to the vertical direction and determining the inclination from the result of the detection performed by the sensor.

3. Variations

The embodiments described above may each be changed as follows:

In each of the embodiments described above, the measurement section 16 measures the three-dimensional shape of the projection surface Sp by causing the imaging section 17 to capture an image of the pattern image Ip projected from the image projection section 15, but not necessarily. For example, in place of the measurement section 16, a three-dimensional measurement apparatus capable of measuring the three-dimensional shape of the projection surface Sp may be provided. The three-dimensional measurement apparatus may employ a method for projecting structural light or a TOF (time of flight) method. The method for projecting structural light may include projecting the structural light from the image projection section 15, as in the embodiments described above, or may include projecting the structural light from a projection apparatus provided in the three-dimensional measurement apparatus. The three-dimensional measurement method is not limited to a specific method. Three-dimensional measurement using a phase shift method is likely to provide satisfactory measurement accuracy particularly in near-to-middle range measurement, such as measurement of a distance shorter than 5 m, and therefore readily accurately measure a three-dimensional shape. The phase shift method is therefore preferable as the three-dimensional measurement method.

In the aspect in which a projection apparatus other than the image projection section 15 projects structural light, structural light formed of invisible light (infrared light, for example) can be projected. In this case, the projected structural light is not viewed by the viewer, whereby the three-dimensional shape can be measured and the correction information can be updated during the projection of the display image. In the aspect in which the TOF method is used to measure a three-dimensional shape, not only can the three-dimensional shape be measured and the correction information be updated during the projection of the display image as in the aspect described above, but no projection apparatus that projects invisible light needs to be provided.

In the configuration including the three-dimensional measurement apparatus described above, the three-dimensional coordinates of the reference points C1 when the image projection section 15 projects the pattern image Ip can be calculated based on the measured three-dimensional shape of the projection surface Sp and the arrangement of the image projection section 15 and the three-dimensional measurement apparatus, so that the pattern image Ip does not actually needs to be projected. Similarly, as in the embodiments described above, also in the configuration including the image projection section 15 and the imaging section 17, for example, projection of structural light via the image projection section 15 and recognition of the three-dimensional shape of the projection surface Sp based on the image capturing performed by the imaging section 17 allows calculation of the three-dimensional coordinates of the reference points C1 in the pattern image Ip projected by the image projection section 15 based on the arrangement of the image projection section 15 and the imaging section 17. Therefore, also in the configuration described above, no pattern image Ip actually needs to be projected.

In each of the embodiments described above, the image projection section 15 projects the pattern image Ip, in which the plurality of rectangular unit patterns Uw and unit patterns Uk are arranged in a matrix, and the measurement section 16 detects the vertices of the rectangular unit patterns Uw, that is, the intersections of the squares of the lattice as the reference points C1, but the reference points C1 are not limited to the vertices of the unit patterns Uw. For example, the image projection section 15 may project a pattern image in which a plurality of unit patterns each having a luminance distribution are arranged, and the measurement section 16 may detect the maximum or minimum luminance position in each of the unit patterns as a reference point C1. Instead, the position of the center of gravity of each of a plurality of figures arranged in a pattern image may be detected as a reference point C1.

The embodiments described above have each been described with reference to the projector 100 including the image projection section 15, the measurement section 16, and other components integrated with one another, but part or entirety of the components may be separate from each other. When the image projection section 15 and the measurement section 16 are separate from each other, however, the state of the arrangement thereof changes whenever the projector 100 is installed, so that calibration needs to be performed whenever the projector 100 is installed. The calibration refers to the process of associating the coordinates in the rectangular pattern image Ip with the coordinates in the captured image Ic.

In each of the embodiments described above, although the transmissive liquid crystal light valves 22R, 22G, and 22B are used as the light modulators, reflective light modulators, such as reflective liquid crystal light valves, can be used. Instead, for example, a digital mirror device that includes micromirrors as pixels and controls the direction in which light incident thereon exits on a micromirror basis to modulate the light outputted from the light source 21 can be used. Further, a plurality of light modulators are not necessarily provided on a color light flux basis, and a single light modulator may modulate a plurality of color light fluxes in a time division manner.

4. Aspects Derived from at Least One of Embodiments and Variations

The present disclosure is not limited to the embodiments or variations described above and can be achieved in a variety of aspects to the extent that they do not depart from the substance of the present disclosure. For example, the present disclosure can be achieved by the aspects below. The technical features in the embodiments described above that correspond to the technical features in the aspects described below can be replaced or combined with other technical features as appropriate to solve part or entirety of the problem in the present disclosure or achieve part or entirety of the effects of the present disclosure. Further, when any of the technical features has not been described as an essential feature in the present specification, the technical feature can be deleted as appropriate.

An aspect of an image projection system controlling method according to the present disclosure includes a first estimation process, a first calculation process, a second calculation process, a second estimation process, a third estimation process, a generation process, a correction process, and a projection process. The first estimation process estimates a normal vector in each of N regions, into which a projection surface on which an image is projected is divided, based on measurement information, which is the result of three-dimensional measurement of the shape of the projection surface. N is an integer greater than or equal to two. The first calculation process calculates an average normal vector that is the average of the N normal vectors. The second calculation process calculates a first vector along an axis corresponding to a component having the largest degree of dispersion among the N normal vectors out of the three-axis components representing the vector. The second estimation process estimates a reference plane having a normal vector that is the cross product of the first vector and the average normal vector. The third estimation process estimates an imaginary projection surface that is a surface that is based on the result of projection of the three-dimensional shape of the projection surface indicated by the measurement information on the reference plane and is perpendicular to the reference plane. The generation process generates correction information for image correction based on the imaginary projection surface. The correction process corrects a projection image based on the correction information. The projection process projects the corrected projection image on the projection surface. In the present aspect, at least part of noise contained in the result of three-dimensional measurement of the projection surface for the estimation of the imaginary projection surface is removed by projecting the result of the three-dimensional measurement on the reference plane. The image distortion correction based on the correction information generated based on the imaginary projection surface is therefore not affected by the at least part of noise. As described above, the present aspect allows reduction in the effect of the noise contained in the result of the measurement on the projection image distortion correction based on the result of the measurement of the three-dimensional shape of the projection surface. As for the first and second calculation processes, the second calculation process may be carried out first, or the first and second calculation processes may be carried out in parallel.

In the image projection system controlling method according to a more preferable aspect, in the third estimation process, a filtering process is carried out on the result of the projection of the three-dimensional shape of the projection surface indicated by the measurement information on the reference plane, and a surface that is based on the result of the projection having undergone the filtering process and is perpendicular to the reference plane may be estimated as the imaginary projection surface. A specific example of the filtering process may be the process of degenerating the result of the projection in the direction of the first vector into a single line. Specifically, a Gaussian filtering process may be used as the filtering process. According to the present aspect, since the imaginary projection surface is estimated by further removing noise contained in the result of the three-dimensional measurement of the projection surface, the effect of the noise contained in the result of the measurement on the projection image distortion correction based on the result of the measurement of the three-dimensional shape of the projection surface can further be reduced.

In the image projection system controlling method according to a more preferable aspect, the generation process may generate the correction information in such a way that the vertical axis in the projection image coincides with the normal vector to the reference plane. According to the present aspect, a projection image having a vertical axis in the direction of the normal vector to the reference plane can be projected on the projection surface.

The image projection system controlling method according to another preferable aspect may include a measurement process of measuring the inclination of a projector that projects the projection image with respect to the vertical axis, and the generation process may generate the correction information in such a way that the inclination of the vertical axis in the projection image with respect to the normal vector to the reference plane coincides with the inclination of the projector. According to the present aspect, a projection image in which the vertical axis inclines with respect to the normal vector to the reference plane in accordance with the inclination of the projector with respect to the vertical axis can be projected on the projection surface.

An aspect of an image projection system according to the present disclosure includes a correction apparatus and a projection apparatus. The correction apparatus estimates a normal vector in each of N regions, into which a projection surface on which an image is projected is divided, based on measurement information, which is the result of three-dimensional measurement of the shape of the projection surface. The correction apparatus calculates an average normal vector that is the average of the N normal vectors and further calculates a first vector along an axis corresponding to a component having the largest degree of dispersion among the N normal vectors out of the three-axis components representing the vector. The correction apparatus estimates a reference plane having a normal vector that is the cross product of the first vector and the average normal vector. The correction apparatus estimates an imaginary projection surface that is a surface that is based on the result of projection of the three-dimensional shape of the projection surface indicated by the measurement information on the reference plane and is perpendicular to the reference plane. The correction apparatus generates correction information for image correction based on the imaginary projection surface. The correction apparatus corrects a projection image based on the correction information. The projection apparatus projects the projection image corrected by the correction apparatus on the projection surface. Also in the present aspect, N is an integer greater than or equal to two. The present aspect allows reduction in the effect of the noise contained in the result of the measurement on the projection image distortion correction based on the result of the measurement of the three-dimensional shape of the projection surface.

What is claimed is:

1. An image projection system controlling method comprising:

estimating a normal vector in each of N regions, into which a projection surface on which an image is projected is divided, based on measurement information, which is a result of three-dimensional measurement of a shape of the projection surface;

calculating an average normal vector that is an average of the N normal vectors;

calculating a first vector along an axis corresponding to a component having a largest degree of dispersion among the N normal vectors out of three-axis components representing the vector;

estimating a reference plane having a normal vector that is a cross product of the first vector and the average normal vector;

estimating an imaginary projection surface that is a surface that is based on a result of projection of the three-dimensional shape of the projection surface indicated by the measurement information on the reference plane and is perpendicular to the reference plane;

generating correction information for image correction based on the imaginary projection surface;

correcting a projection image based on the correction information; and projecting the corrected projection image on the projection surface, wherein N is an integer greater than or equal to two.

2. The image projection system controlling method according to claim 1, wherein the correction information is so generated that a vertical axis in the projection image coincides with a normal vector to the reference plane.

3. The image projection system controlling method according to claim 1, further comprising:

measuring inclination of a projector that projects the projection image with respect to a vertical axis; and generating the correction information in such away that inclination of a vertical axis in the projection image with respect to a normal vector to the reference plane coincides with the inclination of the projector.

4. An image projection system comprising:

a processor programmed to:

estimate a normal vector in each of N regions, into which a projection surface on which an image is projected is divided, based on measurement information, which is a result of three-dimensional measurement of a shape of the projection surface;

calculate an average normal vector that is an average of the N normal vectors;

calculate a first vector along an axis corresponding to a component having a largest degree of dispersion among the N normal vectors out of three-axis components representing the vector;

estimate a reference plane having a normal vector that is a cross product of the first vector and the average normal vector;

estimate an imaginary projection surface that is a surface that is based on a result of projection of the three-dimensional shape of the projection surface indicated by the measurement information on the reference plane and is perpendicular to the reference plane;

generate correction information for image correction based on the imaginary projection surface; and correct a projection image based on the correction information; and a projection lens that projects the projection image corrected by the processor on the projection surface, wherein N is an integer greater than or equal to two.

* * * * *